(No Model.)
J. O. EGERTON.
STEAM COOKING UTENSIL.
No. 382,595.  Patented May 8, 1888.
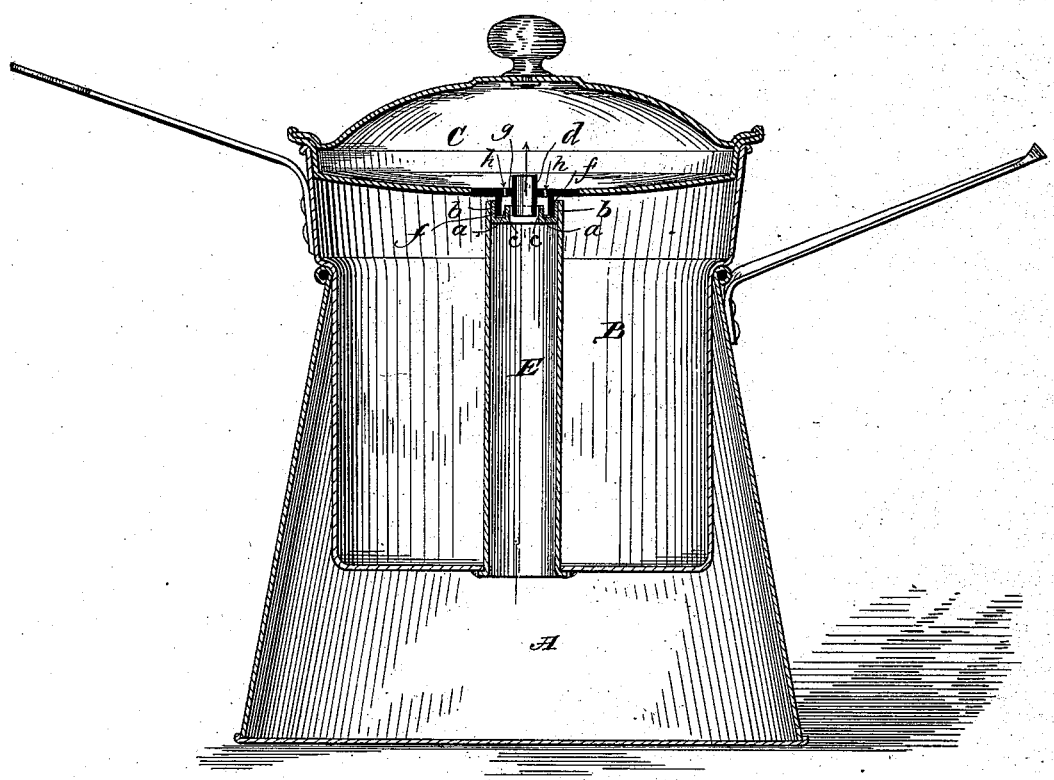
Witnesses
Wm. F. Bellong
G. M. Chamberlain
Inventor,
James O. Egerton,
By his Attorneys

UNITED STATES PATENT OFFICE.

JAMES O. EGERTON, OF SPRINGFIELD, MASSACHUSETTS.

STEAM COOKING UTENSIL.

SPECIFICATION forming part of Letters Patent No. 382,595, dated May 8, 1888.

Application filed December 8, 1887. Serial No. 257,311. (No model.)

*To all whom it may concern:*

Be it known that I, JAMES O. EGERTON, a citizen of the United States, residing at Springfield, in the county of Hampden and State of Massachusetts, have invented new and useful Improvements in Steam Cooking Utensils, of which the following is a specification.

This invention relates to a culinary utensil particularly designed for use in heating and boiling food and other substances or articles, the purpose of which being to provide a conduit through the receptacle for containing the matter to be so heated, for the passage of steam from an independent water-receptacle, and a means for condensing the so-conducted steam and for permitting a return of the water or condensed steam to said water-receptacle, whereby an effective live-steam circulation is constantly maintained; and the invention consists in the construction and combination of the various parts of the apparatus, all substantially as will be hereinafter more particularly described, and pointed out in the claim.

Reference is to be had to the accompanying drawing, forming a part of this specification, in which a culinary utensil formed in accordance with the present invention is illustrated in central vertical section, and which comprises three separable parts—viz., the outer water jacket or receptacle, A, the inner food-receiving receptacle, B, and the chambered cover C, said receptacle B closely fitting at and within the mouth of the vessel A, and is provided with a vertical tube, E, axially or otherwise suitably arranged, open at its lower and upper ends, the latter end, however, being contracted and provided with an internal concentric annular groove or channel, $a$, formed by an outer wall, $b$, and an inner wall, $c$, and intermediate web, as shown, and the chambered cover is provided with a short tube, $d$, and a concentric downwardly-extending annular flange, $f$, the intermediate joining-web $g$ being perforated, as at $h$, and all so arranged and disposed thereon that when the lid is in place the tube $d$ will enter the contracted opening of the tube E and the circular flange $f$ of the cover will enter the annular channel $a$ at the end of said tube E, lying closely against the outer wall of the annular groove $a$, but by its inner edge free from the outer edge of the inner flange, $c$, of the tube E, as shown.

With a suitable supply of water in the outer vessel, A, the receptacle B in place and closed by the chambered cover C, and under suitable heat, the steam generated in the outer chamber will pass upwardly through the passage E and the short tube $d$ into the cover-chamber, where, on its condensation, the water will return through the perforations $h\ h$ and percolate into and through the tube E to the vessel A, it being noticed that the tube $d$ is extended above the inside of the lower wall of the chambered cover C, thus preventing the condensed steam entering such tube for its return; and it will be seen that by providing the condensing chambered cover and the outlet for the condensed steam therefrom a rapid and lively steam circulation is secured through the tube E, thereby securing increased and more evenly distributed heat within the food receiving and cooking receptacle B. The downwardly-extending annular flange $f$ of the cover, by its close contact against the outer wall, $b$, of annular groove $a$, as also by the gathering of water in said groove $a$ to form a water-seal, prevents the steam from entering the food-receptacle B.

What I claim as my invention is—

A cooking utensil comprising the outer water-chamber, A, the cooking-chamber B, fitting therein and provided with a tube, E, open at its upper and lower ends, and at the former end provided with the annular groove $a$, and the chambered cover C, for closing said cooking-chamber, provided with the tube $d$, adapted to extend downwardly into said tube E and having the downwardly-projecting annular flange $f$, adapted to extend into the said annular groove $a$, and also having the perforations $h\ h$, all substantially as described and shown, for the purpose specified.

JAMES O. EGERTON.

Witnesses:
H. A. CHAPIN,
G. M. CHAMBERLAIN.